United States Patent [19]

Blanchard

[11] 4,331,432
[45] May 25, 1982

[54] HYDRAULICALLY ACTUATED TWO-SPEED TRANSMISSION FOR A MARINE PROPULSION DEVICE

[75] Inventor: Clarence E. Blanchard, Kenosha, Wis.

[73] Assignee: Outboard Marine Corporation, Waukegan, Ill.

[21] Appl. No.: 92,551

[22] Filed: Nov. 8, 1979

[51] Int. Cl.³ .............................................. B63H 21/26
[52] U.S. Cl. ................................. 440/75; 74/336 R; 74/368; 440/900
[58] Field of Search ............... 440/75, 900; 74/336 R, 74/368

[56] References Cited

U.S. PATENT DOCUMENTS

| | | | |
|---|---|---|---|
| 1,795,135 | 3/1931 | Molly | 74/336 |
| 2,219,812 | 10/1940 | Hochstetter | 74/336 |
| 2,785,582 | 3/1957 | Banker | 74/368 X |
| 2,797,588 | 7/1957 | Wargo | 74/368 |
| 2,899,834 | 8/1959 | Polomski | 74/336 X |
| 3,129,602 | 4/1964 | Halberg et al. | 74/368 |
| 4,173,939 | 11/1979 | Strang | 440/75 |

Primary Examiner—F. J. Bartuska
Attorney, Agent, or Firm—Michael, Best & Friedrich

[57] ABSTRACT

Disclosed herein is a marine propulsion device including an input shaft drivingly connected to a power source, a lower unit having a rotatably mounted drive shaft extending in coaxial relation to the input shaft, a rotatably mounted propeller shaft carrying a propeller and drivingly connected to the propeller shaft, and a two-speed transmission drivingly connecting the input shaft to the drive shaft. The transmission includes a third shaft rotatably mounted in parallel relation to the input shaft and the drive shaft, a first pair of meshing gears including a first drive gear mounted on the input shaft and a first driven gear mounted on the third shaft, a second pair of meshing gears including a second drive gear mounted on the third shaft and a second driven gear mounted on the drive shaft, and a one-way overrunning clutch drivingly connecting one of the shafts to a gear mounted on the shaft when the rotational speed of the input shaft is less than a predetermined value. The transmission also includes a fluid pressure actuated selectively actuatable clutch for drivingly connecting the input shaft and the drive shaft when the rotational speed of the input shaft is greater than a first value. The transmission includes a housing and a pair of the meshing gears are disposed in the housing to form a fluid pump for providing fluid to the fluid pressure actuated clutch, the fluid pump developing fluid pressure which increases as the rotational speed of the gears increases.

44 Claims, 3 Drawing Figures

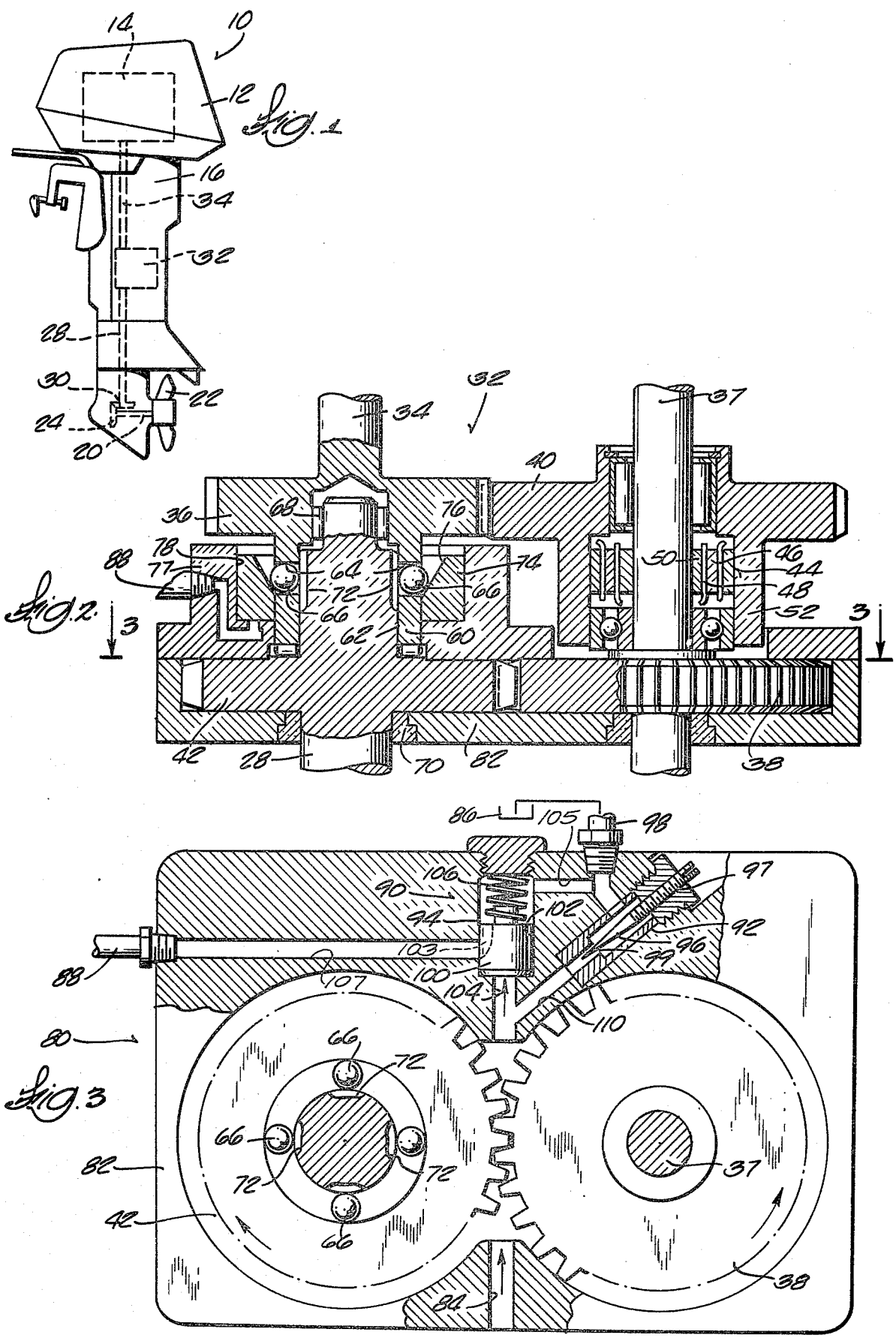

4,331,432

HYDRAULICALLY ACTUATED TWO-SPEED TRANSMISSION FOR A MARINE PROPULSION DEVICE

FIELD OF THE INVENTION

The invention relates to marine propulsion devices and to transmissions and more particularly, to two-speed automatic transmissions for marine propulsion devices and the like.

BACKGROUND PRIOR ART

Attention is directed to U.S. patent application Ser. No. 012,385, filed Feb. 15, 1979 and entitled "Two-Speed Automatic Transmissions for Marine Propulsion Device" and assigned to the assignee of the present invention.

For an illustration of a related transmission for a marine propulsion unit, attention is directed to the U.S. Strang patent application Ser. No. 880,038, filed Feb. 22, 1978 and assigned to the assignee of the present invention.

Attention is also directed to the Halberg et al. U.S. Pat. No. 3,129,602; to the Molly U.S. Pat. No. 1,795,135 and to the Hochstetter U.S. Pat. No. 2,219,812 for illustrations of prior art transmission means.

SUMMARY OF THE INVENTION

The invention includes a marine propulsion device including an input shaft drivingly connected to a power source, a lower unit having a rotatably mounted drive shaft, a rotatably mounted propeller shaft carrying a propeller, means drivingly connecting the drive shaft to the propeller shaft, and a two-speed transmission drivingly connecting the input shaft to the drive shaft. The transmission includes a first drive means between the input shaft and the drive shaft for selectively drivingly connecting the input shaft and the drive shaft, a third shaft rotatably mounted in parallel relation to the input shaft and the drive shaft, a first pair of meshing gears including a first drive gear mounted on the input shaft and a first driven gear mounted on the third shaft, and a second pair of meshing gears including a second drive gear mounted on the third shaft and a second driven gear mounted on the drive shaft and in meshing engagement with the second drive gear, and a one-way overrunning clutch drivingly connecting one of the shafts to a gear mounted on that shaft when the rotational speed of the drive shaft is less than a predetermined value. The first drive means has an input-output speed ratio with a first value. The transmission also includes second drive means for selectively drivingly connecting the input shaft and the drive shaft when the rotational speed of the input shaft is greater than the first value. The second drive means includes a fluid pressure actuated selectively actuatable clutch for drivingly connecting the input shaft and the drive shaft, and means for providing fluid to the fluid pressure actuated clutch including a housing, a pair of the meshing gears disposed in the housing and forming a fluid pump whereby the fluid pressure develops a fluid pressure which increases as the rotational speed of the gears increases. The second drive means has an input-output speed ratio greater than the first value.

The invention also includes a marine propulsion device including a rotatably mounted input shaft drivingly connected to a power source, a lower unit having a rotatably mounted drive shaft, a propeller shaft rotatably mounted in the lower unit and carrying a propeller, and a two-speed transmission drivingly connecting the input shaft to the drive shaft. The transmission includes a third shaft rotatably mounted in parallel relation to the input shaft and the drive shaft, first drive and driven gears in meshing engagement, second drive and driven gears in meshing engagement, means fixedly connecting the second driven gear to the drive shaft, means fixedly connecting two of the first drive gear to the input shaft, the first driven gear to the third shaft, and the third shaft to the second drive gear, a one-way overrunning clutch connecting the other of the first drive gear to the input shaft, the first driven gear to the third shaft, and the third shaft to the second drive gear. The transmission also includes a fluid pressure actuated clutch for selectively drivingly joining the input shaft and the drive shaft for common rotation, and means for providing fluid to the fluid pressure actuated clutch including a fluid pump driven by at least one of the input shaft, the drive shaft and the third shaft and developing a fluid pressure which increases as the rotational speed of the gears increases.

Other features and advantages of the invention are set forth in the following description, in the drawings, and in the claims.

BRIEF DESCRIPTION OF THE DRAWINGS

FIG. 1 is a side elevation view of an outboard motor embodying various features of the invention.

FIG. 2 is an enlarged cross section view of a transmission embodied in the outboard motor illustrated in FIG. 1.

FIG. 3 is a cross section view taken generally along line 3—3 in FIG. 2.

Before explaining the preferred embodiments of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of the description and should not be regarded as limiting.

DESCRIPTION OF THE PREFERRED EMBODIMENTS

Illustrated in FIG. 1 is a marine propulsion device, such as an outboard motor 10, including a power head 12 which houses an internal combustion engine 14, and a lower unit 16. Rotatably mounted in the lower unit 16 is a propeller shaft 20 carrying, at its outer end, a propeller 22. Also located within the lower unit 16 is a gear 24 which is carried by and drivingly connected to the propeller shaft 20. Extending through the lower unit 16 is a rotatably mounted drive shaft 28 carrying a gear 30 which meshes with the gear 24. The drive shaft 28 is drivingly connected to the engine 14 through a two-speed transmission, designated generally by the reference numeral 32.

One of the preferred embodiments of the transmission 32 is shown in greater detail in FIG. 2. While the transmission 32 can have alternative constructions, in the illustrated arrangement it includes a rotatably mounted input shaft 34 drivingly connected to the engine 14 and coaxial with the drive shaft 28, and a first drive gear 36 carried by and mounted for common rotation with the input shaft 34. The transmission 32 also includes a first driven gear 40 which meshes with the first drive gear 36 and which is mounted for rotation on a third shaft 37 parallel to the input shaft 34 and the drive shaft 28. A second drive gear 38 is carried by and mounted for common rotation with the third shaft 37 and a second driven gear 42 which meshes with the second drive gear 38 is fixed to the drive shaft 28 for common rotation therewith. While in the illustrated construction, the gear ratio between the first drive gear 36 and the first driven gear 40 is less than one-to-one, and the gear ratio between the second drive gear 38 and the second drive gear 40 is one-to-one, in alternative embodiments, other suitable speed reduction gear ratios could be employed in order to provide a speed reduction between the input shaft 34 and the drive shaft 28.

The first driven gear 40 is drivingly connected to the third shaft 37 by a suitable one-way overrunning clutch means 44 disposed therebetween. The one-way clutch means 44 is constructed in a conventional manner, and a detailed description of its structural features and mode of operation is not necessary for a full understanding of the invention. Generally, however, the one-way clutch means 44 is arranged so that, in response to rotation of the first driven gear 40 via the first drive gear 36 and the input shaft 34, it drives the third shaft 37 in a first rotational direction. Further, the one-way clutch means 44 is arranged so that, when the rotational speed of the third shaft 37 in the first rotational direction exceeds the rotational speed of the first driven gear 40 in the same direction, i.e., when the third shaft 37 overruns the first driven gear 40, the third shaft 37 becomes free wheeling relative to the first driven gear 40.

While the construction of the one-way overrunning clutch means 44 will not be described in detail, the one-way clutch means 44 generally includes wedges 46 which are supported by a race assembly 48 between the outer surface of a sleeve 50 mounted on the third shaft 37 for rotation with the third shaft 37 and an internal surface of a drum portion 52 of the gear 40. When the drum portion 52 of the gear 40 rotates in one rotational direction with respect to the sleeve 50 and the third shaft 37, the wedges 46 are wedged therebetween and the first driven gear drives the third shaft 37. However, if the shaft 37 is driven faster than the first driven gear 40, the wedges 46 will not prevent the shaft 37 from overrunning the gear 40.

Means are further provided for selectively connecting the input shaft 34 and the drive shaft 28 for direct or one-to-one driving relationship when the rotational speed of the transmission elements reaches a predetermined or selected value. In a preferred embodiment, this means for providing connection between the drive shaft 28 and the input shaft 34 comprises a hydraulically actuated mechanism for connecting the input shaft and the drive shaft and means for adjusting the fluid pressure at which the hydraulically actuated mechanism causes direct driving connection between the input and the drive shaft.

While the hydraulically actuated means for causing driving connection between the input shaft 34 and the drive shaft 28 can have various constructions, in the illustrated arrangement the input shaft 34 includes an axially or downwardly extending sleeve portion 60 which extends downwardly from the first drive gear 36, the sleeve portion 60 having an inner bore 62 adapted to rotatably house the upper end of the drive shaft 28. As illustrated in FIG. 2, the downwardly extending sleeve portion 60 includes four radially extending bores 64 adapted to house balls 66 for limited movement toward and away from the axis of the drive shaft 28.

The drive shaft 28 is supported at its upper end by a first bearing assembly 68 housed in the inner bore 62 of the sleeve 60 and at its lower end by a second bearing 70. As best illustrated in FIG. 2, the drive shaft 28 also includes a plurality of indentations 72 spaced around its periphery and adjacent to the balls 66 and for receiving the balls 66 therein.

Hydraulically actuated means are also provided for selectively forcing the balls 66 inwardly into the peripheral indentations 72 in the drive shaft 28 to thereby provide a driving connection between the input shaft 34 and the drive shaft 28. While various means can be provided, in the illustrated construction, the means for causing inward movement of the balls 66 includes a cylindrical sleeve or shifter cone 74 having a tapered inner surface 76, the surface 76 tapering upwardly and outwardly whereby upon upward movement of the shifter cone 74, the inner surface 76 engages the balls 66 and forces them inwardly into the peripheral indentations 72 in the drive shaft whereby the input shaft 34 will drive the drive shaft 28 in one-to-one relation. Movement of the shifter cone 74 in the opposite or downward direction permits outward movement of the balls 66 and disengagement of the one-to-one driving connection between the input shaft 34 and the drive shaft 28. The transmission housing 77 includes a cylinder 78 which in turn houses the shifter cone 74 for slidable reciprocal movement.

Means are also provided for selectively forcing the shifter cone 74 upwardly with respect to the cylinder 78 to thereby cause the balls 66, supported by the downwardly extending sleeve portion 60, to be driven inwardly and to thereby effect direct driving engagement of the input shaft 34 and the drive shaft 28. This means for forcing the shifter cone 74 upwardly includes a hydraulic pump 80. While the hydraulic pump 80 can have various constructions, in the illustrated arrangement, it includes a housing portion 82 of the transmission housing 77 and surrounding the second drive and driven gears 38 and 42, respectively. In alternative constructions, the first drive and driven gears 36 and 40, respectively or a third set of meshing gears could be employed in the hydraulic pump. A hydraulic fluid conduit 84 is provided for supplying hydraulic fluid from a reservoir 86 to the hydraulic pump 80, and a second hydraulic fluid conduit 88 extends from the housing 82 to the cylinder 78 for supplying hydraulic fluid under pressure to the cylinder 78.

The means for selectively forcing the shifter cone 74 upwardly also includes means for preventing the flow of hydraulic fluid to the cylinder 78 and for venting the cylinder 78 until the second drive and driven gears 38 and 42 reach a selected rotational speed. While various arrangements could be provided, in the illustrated construction such means comprises an adjustable or variable valve means 90, illustrated in the drawings as a needle valve 92, and intended to provide a bypass for a limited fluid flow, and a shuttle valve 94 disposed in the fluid conduit 88, the shuttle valve 94 providing means for selectively precluding fluid flow to the cylinder 78.

In the illustrated construction the needle valve 92 has an adjustable needle 96 controlling the amount of fluid exhausted from the housing 80 and returned through a return line 98 to the reservoir 86. The needle 96 is threadably supported in a threaded bore 97 so as to be adjustably moveable toward and away from a valve seat 99. The needle 96 can thus be adjusted to vary the amount of fluid permitted to flow past the valve seat 99 to the reservoir 86.

The shuttle valve 94 includes a reciprocal shuttle 100 slidably supported in a valve cylinder 102, the valve cylinder communicating at one end with an output port of the fluid pump 80, communicating at its opposite end with the reservoir 86 through a conduit 105 and communicating intermediate its opposite ends with a conduit 107. The shuttle 100 is movable from a first position wherein the shuttle 100 prevents fluid flow from the output port 104 to the fluid line 88 and wherein fluid is permitted to flow from the conduit 107, through a notch 103 in the shuttle and through conduit 105 to the reservoir, and to a second or retracted position wherein the shuttle 100 is moved to a second position permitting fluid flow from the output port 104 to the fluid line 88 and to the cylinder 78. The shuttle 100 is biased against movement toward the second position by a compression spring 106.

In operation of the hydraulically operated two-speed transmission of the invention, power is transmitted through the input shaft 34 and through the first drive gear 36 to the first driven gear 40 and through the one-way overrunning clutch 44 to the third shaft 37. Power is then transmitted through the second drive gear 38 and the second driven gear 42 to the drive shaft 28. The gears of this drive provide a drive ratio of less than one-to-one, i.e. the drive shaft 28 is driven at a speed lower than the input shaft 34.

The second drive and driven gears 38 and 42, respectively, housed in the housing 82, also function to pump oil. At relatively low rotational speeds of the second drive and driven gears, when the hydraulic fluid is pumped at a relatively low rate, the shuttle 100 prohibits flow of the hydraulic fluid to the fluid conduit 88 and the hydraulic fluid is returned to the fluid reservoir 86 through the conduit 110, past the needle valve 96 and through the return line 98. As the speed of the second drive and driven gears increases, however, the fluid flow from the pump reaches a point at which it cannot pass the adjustable needle valve 92 fast enough, and the fluid pressure on the shuttle 100 overcomes the force of the compression spring 106 whereby the shuttle 100 is shifted to a position permitting fluid flow through the conduit 88 to the cylinder 78 housing the shifter cone 74. The fluid flow to the cylinder 78 thus causes the shifter cone 74 to move toward a position wherein the balls 66 are forced into the peripheral indentations 72 in the drive shaft 28 thereby causing a one-to-one driving connection between the input shaft 34 and the drive shaft 28. As the drive shaft 28 then begins to rotate at a higher speed, thereby causing the second drive gear 38 and the third shaft 37 to rotate faster than the first driven gear 40, the one-way overrunning clutch 44 will permit rotation of the third shaft 37 at a speed higher than that of the first driven gear 40.

If the speed of the input shaft 34 is reduced, the speed of the second drive and driven gears is reduced, thereby reducing the oil pressure on the shuttle 100, whereby the compression spring 106 will cause movement of the shuttle 100 to a position blocking flow of hydraulic fluid from port 104 to the conduit 88 and venting the conduit 88 through fluid line 105 thereby permitting the sleeve or shifter cone 74 to return to its original position whereby the balls 66 will move outwardly once again permitting independent rotation of the input shaft 34 and the drive shaft 28.

One of the advantages of the illustrated construction, is that the adjustable needle valve 92 permits adjustment of the flow of hydraulic fluid to the reservoir 86 and thereby permits adjustment of the speed at which the transmission 32 will shift from the low speed rotation to the one-to-one speed ratio. This is particularly advantageous to permit the marine propulsion device to be used on boats of different sizes and weights and permits adjustment of the speed at which the transmission will shift depending on the propeller configuration used on the motor.

While one embodiment of the transmission 32 has been described, it should be understood that various alternative embodiments are also within the scope of the invention. For example, the overrunning clutch 44 could also be located between the second drive gear 38 and the third shaft 37 or between the first drive gear 36 and the input shaft 34. Similarly, the transmission 32 could be constructed to drive a pair of drive shafts rather than a single drive shaft 28. Alternatively, the input shaft 34 and the drive shaft 28 could be mounted in a non-coaxial arrangement with the second driven gear 42 connected to the drive shaft by suitable gearing.

Various features of the invention are set forth in the following claims:

I claim:

1. A marine propulsion device comprising an input shaft drivingly connected to a power source, a lower unit having a rotatably mounted drive shaft extending in coaxial relation to said input shaft, a rotatably mounted propeller shaft carrying a propeller, means drivingly connecting said drive shaft to said propeller shaft, and a two-speed transmission drivingly connecting said input shaft to said drive shaft and including a first drive means between said input shaft and said drive shaft for selectively drivingly connecting said input shaft and said drive shaft and including a third shaft rotatably mounted in parallel relation to said input shaft and said drive shaft, a first pair of meshing gears including a first drive gear mounted on said input shaft and a first driven gear mounted on said third shaft, and a second pair of meshing gears including a second drive gear mounted on said third shaft and a second driven gear mounted on said drive shaft, and a one-way overrunning clutch drivingly connecting one of said shafts to a gear mounted on said one shaft when the rotational speed of said input shaft is less than a predetermined value, said first drive means having an input-output speed ratio with a first value, and second drive means for selectively drivingly connecting said input shaft and said drive shaft when the rotational speed of said input shaft is greater than said first value, said second drive means including a fluid pressure actuated selectively actuatable clutch for drivingly connecting said input shaft and said drive shaft, and means for providing fluid to said fluid pressure actuated clutch including a housing, a pair of said meshing gears being disposed in said housing and forming a fluid pump developing a fluid pressure which increases as the rotational speed of said gears increases, said second drive means having an input-output speed ratio with a second value greater than said first value.

2. A marine propulsion device as set forth in claim 1 wherein said means for providing fluid to said fluid pressure actuated clutch includes means for preventing fluid flow to said fluid pressure actuated clutch until the fluid pressure developed by said fluid pump increases to a predetermined pressure.

3. A marine propulsion unit as set forth in claim 2 wherein said means for providing fluid to said fluid pressure actuated clutch further includes means for varying said predetermined pressure at which fluid is conveyed to said fluid actuated clutch.

4. A marine propulsion device as set forth in claim 1 wherein said fluid pressure actuated clutch includes at least one movable member supported by one of said input shaft and said drive shaft and being selectively movable into engagement with the other of said input shaft and said drive shaft, and fluid actuated means for causing movement of said movable member into such engagement.

5. A marine propulsion device as set forth in claim 1 wherein said fluid pressure actuated clutch includes a sleeve extending from one of said input shaft and said drive shaft and surrounding an end to the other of said input shaft and said drive shaft, said end of said other of said input shaft and said drive shaft including an indentation in the circumferential surface thereof, said sleeve including means for supporting a movable member for selective movement into said indentation for causing rotation of said sleeve with said end, and fluid pressure actuated means for causing said movable member to move into said indentation.

6. A marine propulsion device as set forth in claim 5 and wherein said fluid pressure actuated clutch further includes a collar surrounding said sleeve and movable axially with respect to said sleeve from a first position to a position wherein said collar engages said movable member and moves said movable member into said indentation, and fluid means for causing movement of said collar.

7. A marine propulsion device as set forth in claim 1 wherein said overrunning clutch is between one of said first drive gear and said input shaft, said first driven gear and said third shaft, and said second drive gear and said third shaft.

8. A marine propulsion device set forth in claim 1 wherein said second drive gear and said second driven gear are disposed in said housing and form said fluid pump.

9. A marine propulsion device as set forth in claim 1 and further including means for adjusting the speed at which said selectively actuatable means joins said input shaft and said drive shaft.

10. A marine propulsion device comprising a rotatably mounted input shaft drivingly connected to a power source, a lower unit having a rotatably mounted drive shaft, a propeller shaft rotatably mounted in said lower unit and carrying a propeller, and means drivingly connecting said drive shaft to said propeller shaft, and a two-speed transmission drivingly connecting said input shaft to said drive shaft and including a third shaft rotatably mounted in parallel relation to said input shaft and said drive shaft, first drive and driven gears in meshing engagement, second drive and driven gears in meshing engagement, means fixedly connecting said second driven gear to said drive shaft, means fixedly connecting two of said first drive gear to said input shaft, said first driven gear to said third shaft, and said third shaft to said second drive gear, a one-way overrunning clutch connecting the other of said first drive gear to said input shaft, said first driven gear to said third shaft, and said third shaft to said second drive gear, and a fluid pressure actuated clutch for selectively drivingly joining said input shaft and said drive shaft for common rotation, and means for providing fluid to said fluid pressure actuated clutch including a fluid pump driven by at least one of said input shaft, said drive shaft and said third shaft and developing a fluid pressure which increases as the rotational speed of said gears increases.

11. A marine propulsion device as set forth in claim 10 and further including means for adjusting the speed at which said selectively actuatable means joins said input shaft and said drive shaft.

12. A marine propulsion device as set forth in claim 10 wherein said fluid pump includes a housing, and a pair of said meshing gears disposed in said housing for pumping fluid.

13. A marine propulsion device as set forth in claim 10 wherein said means for providing fluid to said fluid pressure actuated clutch includes means for preventing fluid flow to said fluid pressure actuated clutch until the fluid pressure developed by said fluid pump increases to a predetermined pressure.

14. A marine propulsion device as set forth in claim 13 wherein said means for providing fluid to said fluid pressure actuated clutch further includes means for varying said predetermined pressure at which fluid is conveyed to said fluid actuated clutch.

15. A marine propulsion device as set forth in claim 10 wherein said fluid pressure actuated clutch includes at least one movable member supported by one of said input shaft and said drive shaft and selectively movable into engagement with the other of said input shaft and said drive shaft, and fluid actuated means for causing movement of said movable member into such engagement.

16. A marine propulsion device as set forth in claim 10 wherein said fluid pressure actuated clutch includes a sleeve extending from one of said input shaft and said drive shaft and surrounding an end of the other said input shaft and said drive shaft, said end of said other of said input shaft and said drive shaft including an indentation in the circumferential surface thereof, said sleeve including means for supporting a movable member for selective movement into said indentation for causing rotation of said sleeve with said end, and fluid pressure actuated means for causing said movable member to move into said indentation.

17. A marine propulsion device as set forth in claim 16 and wherein said fluid pressure actuated clutch further includes a collar surrounding said sleeve and movable axially with respect to said sleeve from a first position to a position wherein said collar engages said movable member and moves said movable member into said indentation, and fluid means for causing movement of said collar.

18. A marine propulsion device as set forth in claim 10 wherein said overrunning clutch is between one of said first drive gear and said input shaft, said first driven gear and said third shaft, and said second drive gear and said third shaft.

19. A marine propulsion device as set forth in claim 10 wherein said second drive gear and said second driven gear are disposed in said housing and form said fluid pump.

20. A marine propulsion device as set forth in claim 10 wherein said drive shaft and said input shaft are coaxial.

21. A marine propulsion device as set forth in claim 10 wherein said input shaft and said drive shaft extend in coaxial relation.

22. A marine propulsion device comprising a rotatably mounted input shaft drivingly connected to a power source, a lower unit having a rotatably mounted drive shaft extending in coaxial relation to said input shaft, a propeller shaft rotatably mounted in said lower unit and carrying a propeller, means drivingly connecting said drive shaft to said propeller shaft, and a two-speed transmission drivingly connecting said input shaft to said drive shaft, said two-speed transmission including a third shaft rotatably mounted in parallel relation to said input shaft and said drive shaft, first drive and driven gears in meshing engagement, second drive and driven gears in meshing engagement, means fixedly connecting one of said first drive gear to said input shaft and said first driven gear to said third shaft, a one-way overrunning clutch connecting the other of said first drive gear to said input shaft and said first driven gear to said third shaft, means fixedly connecting said second drive gear to said third shaft, means fixedly connecting said second driven gear to said drive shaft, and a fluid pressure actuated clutch for selectively drivingly connecting said input shaft and said drive shaft, and means for providing fluid to said fluid pressure actuated clutch including a housing and a pair of meshing gears disposed in said housing and forming a fluid pump developing a fluid pressure which increases as the rotational speed of said gears increases.

23. A marine propulsion device as set forth in claim 22 wherein said input shaft and said drive shaft extend in coaxial relation.

24. A marine propulsion device as set forth in claim 22 wherein said means for providing fluid to said fluid pressure actuated clutch includes means for preventing fluid flow to said fluid pressure actuated clutch until the fluid pressure developed by said fluid pump increases to a predetermined pressure.

25. A marine propulsion device as set forth in claim 24 wherein said means for providing fluid to said fluid pressure actuated clutch further includes means for varying said predetermined pressure at which fluid is conveyed to said fluid actuated clutch.

26. A marine propulsion device as set forth in claim 22 wherein said fluid pressure actuated clutch includes at least one movable member supported by one of said input shaft and said drive shaft and selectively movable into engagement with the other of said input shaft and said drive shaft, and fluid actuated means for causing movement of said movable member into such engagement.

27. A marine propulsion device as set forth in claim 22 wherein said fluid pressure actuated clutch includes a sleeve extending from one of said input shaft and said drive shaft and surrounding an end of the other said input shaft and said drive shaft, said end of said other of said input shaft and said drive shaft including an indentation therein, said sleeve including means for supporting a movable member for selective movement into said indentation for causing rotation of said sleeve with said end, and fluid pressure actuated means for causing said movable member to move into said indentation.

28. A marine propulsion device as set forth in claim 27 and wherein said fluid pressure actuated clutch further includes a collar surrounding said sleeve and movable axially with respect to said sleeve from a first position to a position wherein said collar engages said movable members and moves said movable member into said indentation, and fluid means for causing movement of said collar.

29. A marine propulsion device as set forth in claim 22 wherein said overrunning clutch is between one of said first drive gear and said input shaft, said first driven gear and said third shaft, and said second drive gear and said third shaft.

30. A marine propulsion device as set forth in claim 22 wherein said second drive gear and said second driven gear are disposed in said housing and form said fluid pump.

31. A marine propulsion device as set forth in claim 22 and further including means for adjusting the speed at which said selectively actuatable means joins said input shaft and said drive shaft.

32. A marine propulsion device comprising a rotatably mounted input shaft drivingly connected to a power source, a lower unit having a rotatably mounted drive shaft, a propeller shaft rotatably mounted in said lower unit and carrying a propeller, and means drivingly connecting said drive shaft to said propeller shaft, and a two-speed transmission drivingly connecting said input shaft to said drive shaft and including a third shaft rotatably mounted in parallel relation to said input shaft and said drive shaft, first drive and driven gears in meshing engagement, second drive and driven gears in meshing engagement, means fixedly connecting three of said first drive gear to said input shaft, said first driven gear to said third shaft, said second drive gear to said third shaft, and said second driven gear to said drive shaft, a one-way overrunning clutch connecting the other of said first drive gear to said input shaft, said first driven gear to said third shaft, said second drive gear to said third shaft, and said second driven gear to said drive shaft, and a fluid pressure actuated clutch for selectively drivingly joining said input shaft and said drive shaft for common rotation.

33. A marine propulsion device in accordance with claim 32 and further including means for providing fluid to said fluid pressure actuated clutch including a fluid pump driven by at least one of said input shaft, said drive shaft and said third shaft and developing a fluid pressure which increases as the rotational speed of said gears increases.

34. A marine propulsion device as set forth in claim 32 wherein said input shaft and said drive shaft extend in coaxial relation.

35. A marine propulsion device as set forth in claim 32 and further including means for adjusting the speed at which said selectively actuatable means joins said input shaft and said drive shaft.

36. A marine propulsion device as set forth in claim 32 wherein said fluid pump includes a housing, and a pair of said meshing gears disposed in said housing for pumping fluid.

37. A marine propulsion device as set forth in claim 32 wherein said means for providing fluid to said fluid pressure actuated clutch includes means for preventing fluid flow to said fluid pressure actuated clutch until the fluid pressure developed by said fluid pump increases to a predetermined pressure.

38. A marine propulsion device as set forth in claim 37 wherein said means for providing fluid to said fluid pressure actuated clutch further includes means for varying said predetermined pressure at which fluid is conveyed to said fluid actuated clutch.

39. A marine propulsion device as set forth in claim 32 wherein said fluid pressure actuated clutch includes at least one movable member supported by one of said input shaft and said drive shaft and selectively movable into engagement with the other of said input shaft and said drive shaft, and fluid actuated means for causing movement of said movable member into such engagement.

40. A marine propulsion device as set forth in claim 32 wherein said fluid pressure actuated clutch includes a sleeve extending from one of said input shaft and said drive shaft and surrounding an end of the other said input shaft and said drive shaft, said end of said other of said input shaft and said drive shaft including an indentation in the circumferential surface thereof, said sleeve including means for supporting a movable member for selective movement into said indentation for causing rotation of said sleeve with said end, and fluid pressure actuated means for causing said movable member to move into said indentation.

41. A marine propulsion device as set forth in claim 40 and wherein said fluid pressure actuated clutch further includes a collar surrounding said sleeve and movable axially with respect to said sleeve from a first position to a position wherein said collar engages said movable member and moves said movable member into said indentation, and fluid means for causing movement of said collar.

42. A marine propulsion device as set forth in claim 32 wherein said overrunning clutch is between one of said first drive gear and said input shaft, said first driven gear and said third shaft, and said second drive gear and said third shaft.

43. A marine propulsion device as set forth in claim 32 wherein said second drive gear and said second driven gear are disposed in said housing and form said fluid pump.

44. A marine propulsion device as set forth in claim 32 wherein said drive shaft and said input shaft are coaxial.

* * * * *